R. L. EDWARDS & J. LEE.
Egg Box.

No. 201,601. Patented March 26, 1878.

Witnesses
John Becker
Fred. Haynes

Inventor
R. L. Edwards
John Lee
by their Attorneys
Brown & Allen

UNITED STATES PATENT OFFICE.

RICHARD L. EDWARDS, OF BROOKLYN, AND JOHN LEE, OF NEW YORK, N. Y., ASSIGNORS TO ANDREW H. LUCAS AND LELAND F. PRINCE, OF ST. LOUIS, MO.

IMPROVEMENT IN EGG-BOXES.

Specification forming part of Letters Patent No. 201,601, dated March 26, 1878; application filed February 17, 1877.

*To all whom it may concern:*

Be it known that we, RICHARD L. EDWARDS, of Brooklyn, in the county of Kings and State of New York, and JOHN LEE, of the city, county, and State of New York, have invented certain new and useful Improvements in Egg-Boxes, of which the following is a description, reference being had to the accompanying drawing, which forms part of this specification.

This invention relates to boxes for the storing and transportation of eggs, in which perforated drawers are used to protect the eggs, by their separate support within the drawers, from breakage; likewise to provide for the preservation of the eggs against decay, and to facilitate the handling of the eggs.

The invention consists in a certain combination, in an egg box or case which opens in front, of the drawers or trays fitting therein, and perforated boards or diaphragms constructed and arranged so that they are sustained by the box or case, and serve both as supports for and partitions between the drawers or trays when slid into their places, and as a means of assisting or keeping the eggs down to their places in the drawers.

An egg-box thus constructed may be very cheaply made, and possesses superior advantages as regards its efficiency in the several respects of the safe-keeping of the eggs, their preservation from decay, and in the handling or packing and removal of them.

Figure 1:
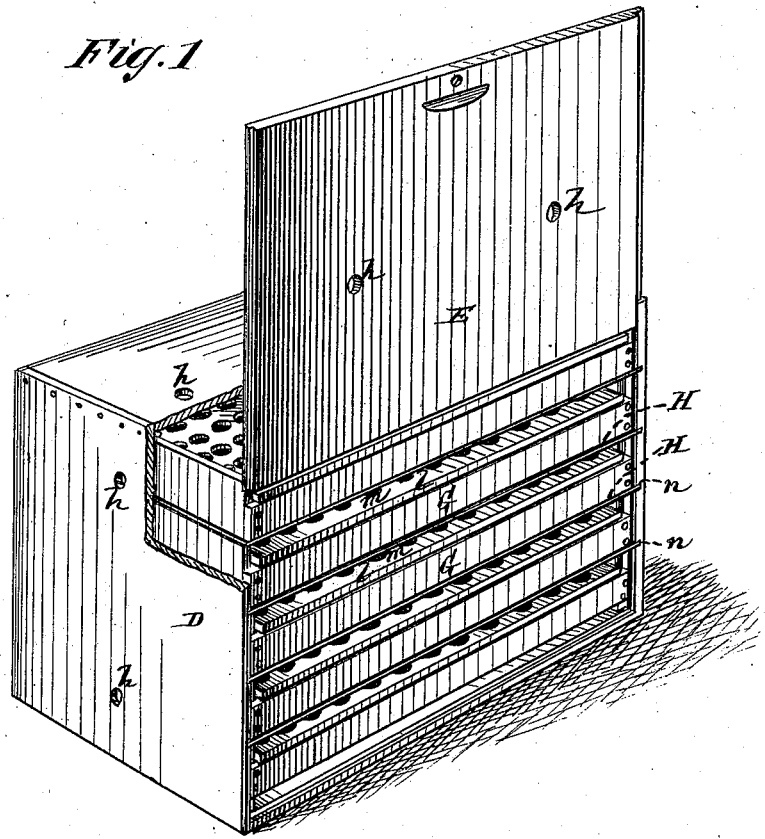
Figure 2:
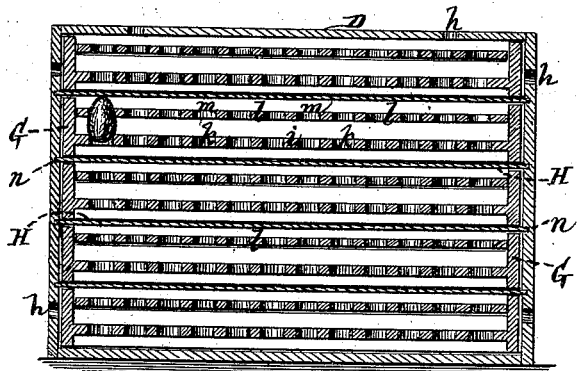
Figure 3:
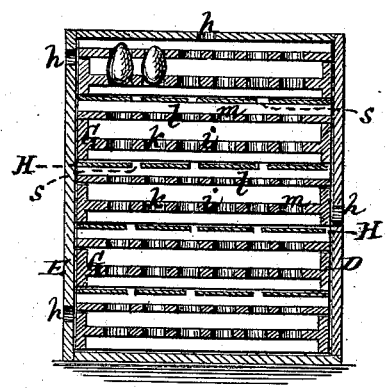
Figure 4:
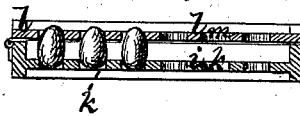

In the drawing, Figure 1 represents a view, in perspective, of an egg box or case constructed in accordance with the invention. Fig. 2 is a longitudinal vertical section of the same, and Fig. 3 a transverse vertical section thereof. Fig. 4 is a cross-section of one of the drawers detached.

D is the box or case, having a perforated top or sides, also a perforated sliding front, E—the perforations in said parts, which provide for free ventilation, and serve to keep the eggs cool and fresh, being indicated by the letters $h\ h$.

G G are the drawers or trays, of which there may be any number, arranged one above the other in the box or case. These drawers, which are slid into and out from the box or case, on opening or removing the sliding cover E, are each constructed with a perforated bottom, $i$, for separate reception and support of the eggs at their one end, and to admit of a free circulation of cooling air round or about the eggs. The holes $k$ in said bottom, which receive within them one end of each egg, may either be cup-shaped or of plain circular form; but it is more convenient and cheaper to make them plain or straight; and this we are enabled to do, and at the same time to provide more effectually against the eggs falling or toppling over, by the combination, with said drawers, of a perforated top, $l$, either hinged to the upper edge of one of the sides of the drawer, or fitting loosely on the sides within the ends of the drawer. The holes $m$ in said top $l$ serve to receive and hold within them the upper end of each egg, and every facility is afforded by said top for the entry and removal of the eggs.

To further guard against injurious or dangerous play of the eggs, and to keep them down to their places, and so prevent breakage, as well as to provide for supporting the drawers or trays without employing special ribs or rails for said drawers to run upon, the box or case D is fitted—as, for instance, with simple grooves $n\ n$ in its sides—with perforated diaphragms or boards H, forming supports for and partitions between the drawers. The perforations $s$ in these diaphragms may either be made by boring holes in said diaphragms, or by constructing the latter in sections of separated slats. Said perforations contribute to ventilate the box or case, and to keep up a cooling current of air about the eggs. The double function or use of these diaphragms—viz., of keeping the eggs in the drawers or trays beneath them down to their places, and of supporting the drawers or trays—simplifies the construction of the egg box or case.

The holes $m$ in the top $l$ of either drawer may either be made cylindrical or of a tapering or inverted cup shape at their lower ends, to receive and hold the upper ends of the eggs within them.

We are aware that an egg-carrier has been constructed of sectional frames hinged together in pairs, and provided with cross-bars containing cavities or receptacles for the reception of the eggs, said frames being adapted to a box in which they are arranged upright. Such is not our invention, and is, therefore, disclaimed.

We claim—

The combination, with the perforated egg box or case D and perforated drawers or trays G, fitting therein, of the perforated boards or diaphragms H, fitted to said case, and serving both to keep the eggs down to their places in the drawers, and to form supports for and partitions between the drawers, essentially as described.

R. L. EDWARDS.
JOHN LEE.

Witnesses:
MICHAEL RYAN,
FRED. HAYNES.